Nov. 19, 1957  G. A. MITCHELL ET AL  2,813,959
BILLET HOLDING AND HANDLING APPARATUS FOR
ELECTRIC INDUCTION HEATERS
Filed Sept. 12, 1955  2 Sheets-Sheet 1
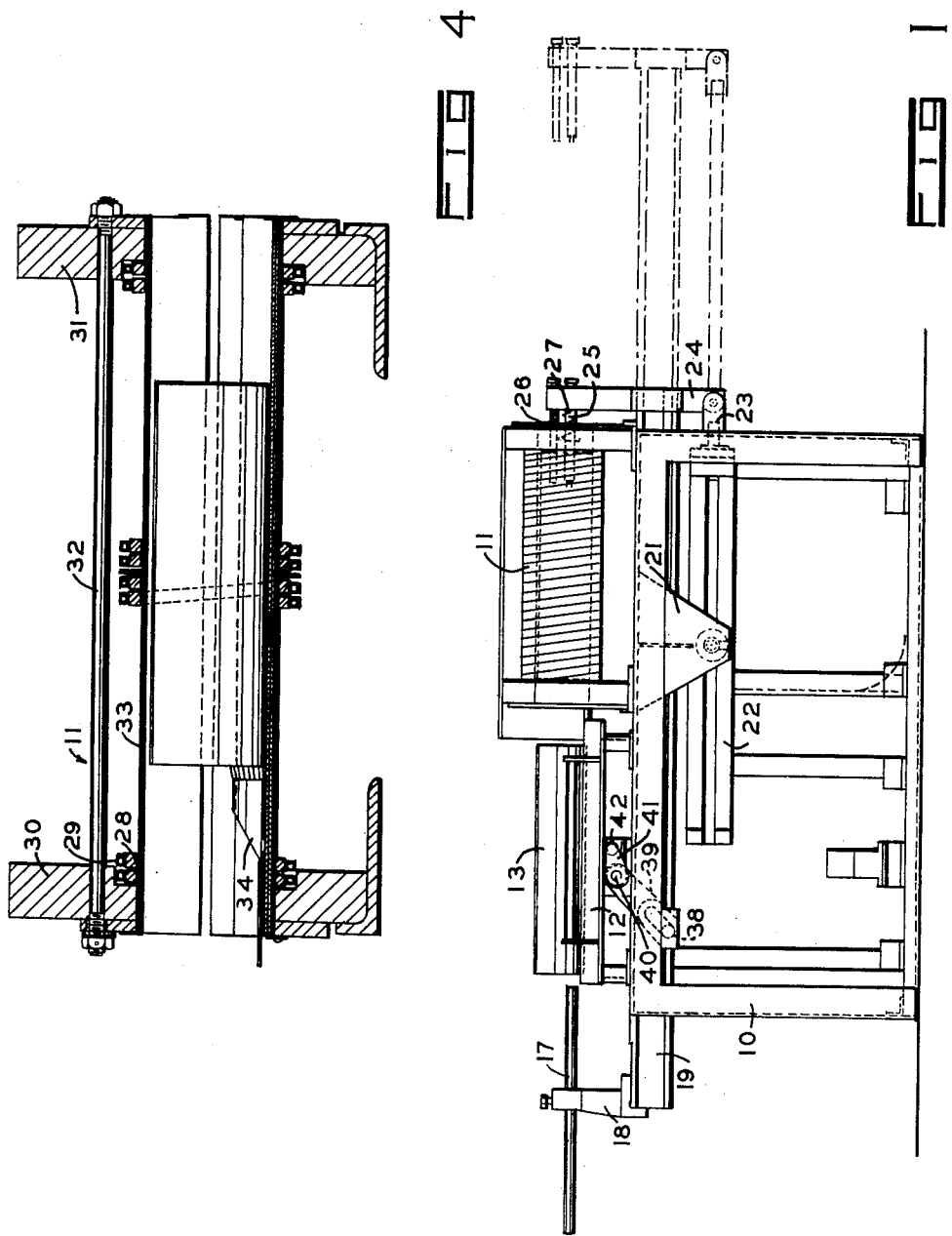
INVENTORS
GEORGE A. MITCHELL
ELMER J. GAYETSKY
BY
ATTORNEY Nov. 19, 1957    G. A. MITCHELL ET AL    2,813,959
BILLET HOLDING AND HANDLING APPARATUS FOR
ELECTRIC INDUCTION HEATERS
Filed Sept. 12, 1955    2 Sheets-Sheet 2
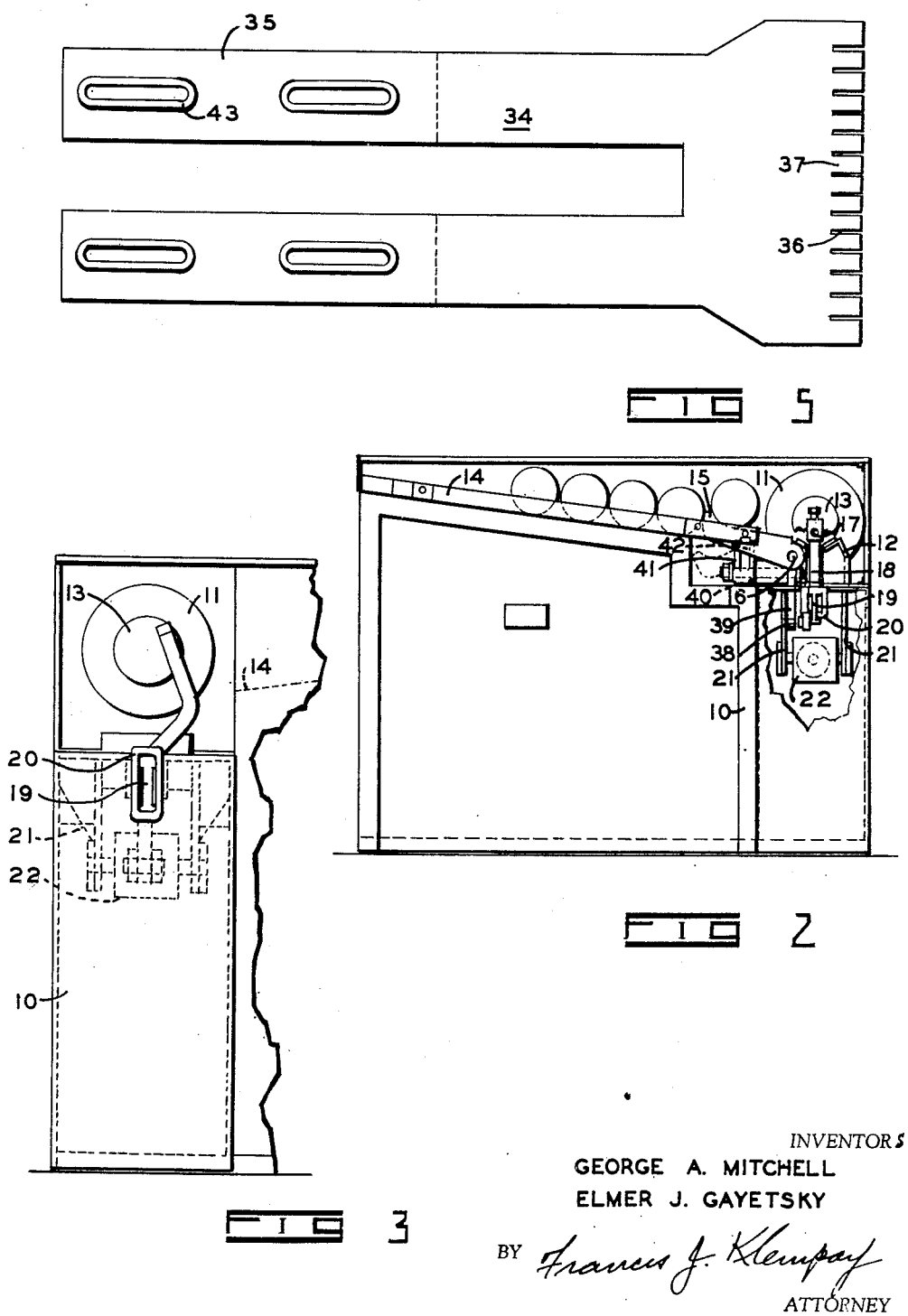
INVENTORS
GEORGE A. MITCHELL
ELMER J. GAYETSKY
BY Francis J. Klempay
ATTORNEY

United States Patent Office 2,813,959
Patented Nov. 19, 1957

2,813,959

BILLET HOLDING AND HANDLING APPARATUS FOR ELECTRIC INDUCTION HEATERS

George A. Mitchell, Hubbard, and Elmer J. Gayetsky, Campbell, Ohio, assignors to Lombard Corporation, Youngstown, Ohio, a corporation of Ohio Application September 12, 1955, Serial No. 533,627

18 Claims. (Cl. 219—10.69)

The present invention relates to metal heating apparatus, and more particularly to improvements in electric induction heaters for non-ferrous metals such as aluminum, for example.

In the extrusion of aluminum and like metals it is common practice to cast or otherwise form the material into cylindrical billets which are first heated and then placed in an extrusion press and forced through a small die opening conforming to the shape of the desired end product. One of the more efficient and generally the preferred methods of heating the billets is to position the same within an electrically energized coil whereby electric currents are induced within the billet so that the same rapidly heats up to the desired temperature.

For purposes of electrical efficiency it is generally preferable to employ polyphase power to energize the induction coil. However, in order to most efficiently employ polyphase power in the induction coils the coils must be arranged to produce a "travelling" magnetic field. Thus, the magnetic field produced by the coils tends to move progressively in a longitudinal direction, from one end to the other of the coil. This causes what is often termed a "motor action" in the billet, tending to eject the same from the end of the induction coil. Thus, the use of polyphase power in this manner necessitates the provision of some means to restrain the billet against the motor action of the travelling magnetic field.

In order that it may be readily determined when the billet thus heated is at the desired temperature it has been common practice to employ a thermocouple device which is placed in contact with the end of the billet. As the thermocouple is heated by conduction from the billet it generates an electrical potential which is utilized to actuate a suitable indicator device and/or automatic control means to deenergize the induction coils at the proper time.

Since aluminum is a relatively good conductor of electricity, and further, since there is usually formed on the outer surface of the billet an oxide coating which is a relatively poor conductor of heat, it is preferable to employ a thermocouple device such as disclosed in the Vollrath U. S. Patent No. 2,466,137 which comprises a pair of spaced prong-like members of dissimilar metal which are projected into the billet, through the oxide coating thereof, so that an accurate and highly responsive temperature indication is afforded.

One of the problems in connection with the use of a thermocouple device of the type described above has been the difficulty of properly retaining the thermocouple in a predetermined pressure contact with the billet throughout the whole of the heating operation. This has been done in the past by providing a combined assembly having an abutment stop thereon to resist the motor action which tends to eject the billet from the induction coil, and having a thermocouple device resiliently mounted with respect to the stop member. However, we have found this arrangement not to be entirely satisfactory since there is presented a problem of removing the stop and thermocouple from the interior of the coil to permit the loading of new billets into the furnace. As an alternative, the billets may be loaded and removed from the same end of the coil, but this is undesirable in that production rates are substantially reduced, it being considerably more efficient to load billets into one end of the coil while removing heated billets from the other end.

Thus, it is the primary object of the invention to provide an improved billet handling and holding arrangement including a combined means for feeding new billets into the interior of the induction coil and for properly positioning the thermocouple element in operative contact with a billet in position for heating. The arrangement is such that there is no need for separate and special means for actuating the thermocouple element so that the same may be removed for loading new billets into the heater.

Another object of the invention is the provision of a new and improved arrangement for positioning a thermocouple device in operative relation to a billet during the induction heating thereof by means of polyphase induction means, or other means producing a motor or solenoid action, wherein there is provided means wholly independent of the thermocouple device, and of the means supporting the same, for retaining or restraining the billet against the motor or solenoid action.

Yet another object of the invention is the provision of a novel arrangement for incorporation in an induction heater of the type which imparts a moving force to a metal billet heated therein of a novel abutment stop member which permits of the feeding of billets into the induction coil while preventing the return movement thereof under the motor action of the coil.

Still another object of the invention is the provision of a novel combined arrangement for moving billets into feeding position, feeding the same into the interior of a coil, and moving a thermocouple device into operative contacting relation with the billet. In this respect, it is freely acknowledged that all of the above mentioned operations are effected in apparatus of heretofore known types. However, the invention in the present case resides in the more specific aspects of a combined mechanism for performing these same operations in a faster and more expeditious manner than has been possible heretofore and with less apparatus or mechanism than has been required heretofore.

The above and other objects and advantages of the invention will become apparent upon full consideration of the following detailed specification and accompanying drawings wherein is disclosed a certain preferred embodiment of the invention.

In the drawing:

Figure 1 is a side elevation of an electric induction billet heating furnace incorporating the teachings of our invention;

Figure 2 is an end elevation of the apparatus of Figure 1;

Figure 3 is an enlarged fragmentary end elevation of the apparatus of Figure 1;

Figure 4 is an enlarged fragmentary longitudinal section view taken generally along the axis of the induction coil of the apparatus of Figure 1; and Figure 5 is an enlarged top plan view of a billet stop member constructed in general accordance with the teachings of our invention and incorporated in the apparatus of Figure 1.

Referring now to the drawing, and initially to Figures 1–3 thereof the numeral 10 designates generally the frame structure of our billet heating furnace. Supported at one end of the frame 10 is an induction coil assembly 11, which may be of generally conventional design, and which is preferably of a type adapted for use with a polyphase power system. At the other end of the frame 10, in axially aligned relation with the induction coil assembly 11, is a billet support 12 which is adapted to retain billets 13 in axial alignment with the coils 11, for subsequent feeding into the interior of the coils.

Positioned beside the billet support 12 and supported on the frame 10 is an inclined billet feeding rack 14 which is arranged to hold a number of billets in side-by-side relation so that the same may be fed in a one-at-a-time manner onto the support 12.

At the lower end of the feeding rack 14 there are provided one or more lifting arms 15 which are pivoted at 16 to the frame 10 and which are adapted to be raised periodically to raise a billet over an obstruction placed at the lower end of the rack 14. Once raised over the obstruction the billets may roll freely onto the support 12, into feeding position.

To feed billets into the interior of the coil 11 we provide a pusher rod 17 which is adjustably mounted on an upwardly extending arm 18, the arm 18 being in turn secured to an elongated longitudinally movable beam 19. The beam 19 is slidably guided in the main frame structure 10 by means of suitable bearings 20 mounted at spaced points on the frame. In accordance with the teachings of the invention, and as illustrated in Figure 1, the beam 19 is somewhat longer than the frame structure generally, so as to project from both ends thereof in certain positions.

Projecting downwardly from the upper portion of the frame 10, in straddling relation to the longitudinally movable beam 19, are spaced mounting brackets 12 which support an elongated fluid cylinder 22, the cylinder 22 being below and parallel to the beam 19. The movable piston rod 23 of cylinder 22 projects in a forwardly direction, and is connected at its forward extremity with an upwardly extending arm or bracket 24. Intermediate its upper and lower ends the bracket 24 is rigidly attached to the forward end of the beam 19, while adjacent the upper extremity of the bracket 24 there is mounted a billet engaging thermocouple assembly comprising a rearwardly extending thermocouple element 25 and an adjacent rearwardly extending reference member 26. In accordance with generally known practice, the thermocouple 25 and reference member 26 are mounted in side-by-side relation, with the thermocouple 25 being resiliently mounted by means of a spring 27, for example, and projecting somewhat rearwardly of the reference member, the latter preferably being adjustably mounted on the bracket 24. Thus, when a billet and the thermocouple assembly are moved into contacting engagement the thermocouple element 25 will yieldably retract in the supporting arm 24 therefor until the forward end face of the billet engages the reference member 26. At this time the thermocouple will be in a predetermined pressure engagement with the end face of the billet so that the pointed prongs of the thermocouple will pierce the thin oxide film on the billet and be retained in good electrical contact with the clean conductive metal.

In accordance with the teachings of the invention the induction coil assembly 11 is so arranged and connected to the power source that the travelling field effect produced thereby, or the solenoid action thereof, depending on whether a polyphase or single phase power source is employed, will be in a direction tending to eject billets in a rearwardly direction from the rearward opening of the coil assembly. It will be understood, however, that motor or solenoid action is not in any way necessary to enable our invention to be successfully practiced. Rather, it is in the nature of a condition which is an unwanted but necessary result, arising from the manner in which the coils 11 are wound, it being more efficient from an electrical standpoint to so wind the coils.

Referring now to Figure 4, it will be observed that the coil assembly 11 comprises a plurality of wound coils 28 of heavy conductor material which are placed in end-to-end relation, in the case of polyphase systems, and which are surrounded by coils 29 for passing cooling fluid in heat conductive relation to the conductors. End plates 30 and 31 are positioned at opposite ends of the coil assembly and held together by means of a plurality of longitudinally extending tie rods or bolts 32. Within the conductive coils 28 there is provided a cylindrical liner member 33 which permits of the free movement of billets into and out of the coil assembly. In accordance with well known practice the liner 33 is split longitudinally throughout its length so that circumferential currents cannot be set up therein during energization of the heating coils 28.

Mounted on the billet support 12, at the entry side of the coil assembly 11, and extending into the interior of the coil is an abutment member 34 which, in accordance with the teachings of the invention, is formed of flat metal of arcuate contour so as to conform generally to the cylindrical liner 33. The abutment member 34, as shown in Figure 5, has a bifurcated outer end portion 35, the legs of which overlie the spaced rail-like members of the billet support 12. The forward or inner end portion of the abutment is provided with a plurality of closely spaced longitudinal slots 36 defining a plurality of resilient tabs 37. These tabs are bent radially inward, substantially as shown in Figure 4, so as to project radially inward of the cylindrical billet receiving chamber of the coil 11. The arrangement, in accordance with the preferred teachings of the invention, is such that the distance from the top of the liner 33 to the tips of the inwardly bent tabs 37 is slightly less than the diameter of the billet to be received in the liner 33. Thus, when the loading cylinder 22 is actuated to move the pusher rod 17 in a forward direction a billet 13 positioned on the leading support 12 is pushed into the coil 11, deforming the tabs 37 slightly as it passes thereover. When the billet has cleared the tabs 37 the same spring back to their normal positions and the billet drops down into contact with the bottom portion of the liner 33. At this time the abutment 34 is in obstructing relation to the billet so that the motor or solenoid forces acting thereon during energization of the coil cannot eject the billet from the furnace.

While, as set forth in the preceding paragraph, it is desirable to utilize the spring-like characteristics of the tabs 37 to positively lock a billet 13 against rearward movement in the coil assembly 11, it is equally as effective in some instances to merely rely upon the dropping of the billet onto the liner 33 after it has passed over the abutment member 34. The billet cannot then move rearwardly past the abutment 34 unless it is first raised over the same.

After a billet 13 is moved into the interior of the coil assembly 11, past the abutment member 34, the feeding cylinder 22 is reversely actuated, withdrawing the pusher rod 17 from the interior of the coil, and moving the thermocouple assembly 25—26 into the coil. When the thermocouple element 25 and reference member 26 therefor contact the billet 13 the same is moved in a rearwardly direction, if necessary, until it is pressed into firm contact with the abutment 34. At this time the billet is firmly held between the reference member 26 and the abutment 34, with the thermocouple element 25 in operative contact with the end face of the billet. The cylinder 22 is then retained in a reversely actuated condition while the power coils 28 are energized to effect the heating operation, the abutment 34 being operative to resist all motor or solenoid forces on the billet while the thermocouple element 25 is retained in proper contact with the billet by means of the cylinder 22.

When the billet is heated to the proper temperature a predetermined potential will be developed across the terminals of the thermocouple 25, so that the coils 28 may be deenergized, by suitable automatic means, now shown, or otherwise.

During the forward or feeding movement of the beam 19 a follower wheel 38 engages a bifurcated control arm 39 which is pivotally mounted on the frame 10 by means of a shaft 40. Keyed to the shaft 40 is an actuating lever 41 which carries a roller 42 at its outer end. The roller 42 underlies a projecting portion of the billet lifting arm or arms 15 so that upon upward pivoting movement of the lever 41 the arms 15 are raised to permit a new billet to roll downwardly toward the support 12.

Thus, as a billet is fed from the support 12 into the interior of the coil assembly 11 the control lever 39 is engaged by the roller 38 on the forwardly moving beam 19 so that the lever 41 and billet lifting arm 15 are raised. This feeds a new billet toward the support 12. When the pusher rod 17 and its supporting bracket 18 are subsequently retracted, upon a reverse actuation of the feed cylinder 22, the billet thus transferred is permitted to roll onto the rack 12, into longitudinal alignment with the pusher rod 17 and coil assembly 11, in readiness for a subsequent feeding operation.

Referring again to Figures 4 and 5, it will be observed that the abutment member 34 is adjustable with respect to the coil assembly 11. We may thereby provide that all billets may be substantially centered with respect to the coil 11 so that most efficient heating is obtained in all cases. Any suitable means may be provided for automatically or manually adjusting the abutment member 34, the illustrated means being a simplified form, wherein elongated slots 43 are provided in the leg portions 35 of the abutment member so that the same may be retained in various longitudinal positions by means of suitable recessed screws, for example.

*Summary of operation*

In summary, assuming a cold billet 13 to be positioned on the support 12 therefor, the feeding cylinder 22 is actuated in a forwardly direction, causing the beam 19 to move forwardly with respect to the frame 10. The pusher rod 17, carried by the beam, engages the rearward end face of the billet, pushing the same into the interior of the coil 11. As the billet enters the coil assembly it passes over the abutment member 34 which prevents the billet from returning.

Simultaneously with the feeding of a billet into the coils 11, one or more lifting arms 15 are actuated through a control arm 39 and lever 41 to roll a new billet toward the support 12.

Once the billet is moved past the abutment 34 the cylinder 22 is reversely actuated to bring the thermocouple element and reference member 26 into pressure contact with the leading end face of the billet. This establishes operative contact between the thermocouple element 25 and the billet, and also presses the billet into firm contact with the abutment member.

At this time the induction coils 28 may be energized from the power source, which may be polyphase or single phase, the coils being so wound or related, however, that any motor of solenoid action produced thereby tends to move the billet toward the rigid abutment member 34, or away from the thermocouple assembly 25—26.

When the heating operation is completed, the feeding cylinder 22 is again actuated in a forwardly direction, simultaneously retracting the thermocouple assembly and advancing the pusher rod 17. A new billet is thereby fed into the coil assembly 11, wherefrom the heated billet may be readily removed and loaded into an extrusion press, for example.

It should thus be apparent that we have fulfilled the several objects initially set forth. We have provided a novel billet handling and holding mechanism for incorporation in electric induction heating furnaces which may be effectively used in connection with polyphase or single phase furnaces, and without regard to whether motor or solenoid forces are exerted upon the billet by the energized induction coils.

One of the novel aspects of our invention is the provision of a generally fixed abutment member which is positioned within the interior of the coil assembly in such manner as to permit of the feeding of billets in a forwardly direction, while obstructing movement of the billets in a rearwardly direction. In combination with such abutment member, we provide a resiliently mounted thermocouple element and adjustable reference member which act in a rearwardly direction to simultaneously bring and maintain the thermocouple element in operative relation with the forward end face of the billet, and to urge the billet in a rearwardly direction into firm contact with the abutment member.

One of the more specific novel aspects of our invention resides in the combined mechanism for loading new billets into the coil and for movably mounting the thermocouple assembly so that the latter is brought into operative relation with the billet and retracted at proper times. This is accomplished by providing an elongated beam which mounts a billet feeding pusher rod at one end and the thermocouple assembly at the other end, with a spacing therebetween of somewhat over two billet lengths. Thus, at the end of a heating operation, the beam is moved forwardly to first disengage the thermocouple assembly and then to simultaneously push a new billet in one end while pushing the heated billet out of the forward end of the coil.

Another specific feature of novelty is in our simplified mechanism which is operated automatically upon forward movement of the feeder rod and thermocouple mounting beam to lift a new billet from a storage rack therefor and roll the same toward a support positioned in axial alignment with the induction coils. When the pusher rod is subsequently retracted the new billet drops onto the support, in readiness for the next feeding operation.

It should be understood, however, that the specific embodiment herein shown and described is intended to be representative only, as many changes may be made therein without departing from the clear teachings of the invention. Reference should therefore be made to the following appended claims in determining the full scope of the invention.

We claim:

1. In an electric induction billet heating furnace, the combination of a generally cylindrical induction coil assembly, means at one end of said coil assembly to feed billets axially forwardly into the interior of said coil assembly, an abutment member fixed within said coil assembly adjacent the said one end thereof to prevent the return movement of a billet positioned within the coil assembly, a thermocouple assembly movable into and out of the other end of said coil assembly, said thermocouple assembly comprising a resiliently mounted thermocouple element and a rigid reference member, and means to forcibly move said thermocouple assembly into the said other end of said coil assembly whereby to bring said thermocouple element and said reference member into pressure contact with the forward end of a billet, the arrangement being such that said billet is retained in clamped relation between said reference and abutment members and in pressure contact with said thermocouple element.

2. Apparatus according to claim 1 further characterized by said coil assembly being arranged to exert a magnetic force upon a billet positioned within the interior thereof, said magnetic force tending to move said billet in a rearwardly direction toward said abutment member.

3. Apparatus according to claim 1 further characterized by said means to forcibly move said thermocouple assembly comprising a fluid cylinder, and further including means driven by said fluid cylinder to feed new billets into the interior of said furnace simultaneously with retracting movements of said thermocouple assembly.

4. In an electric induction billet heating furnace, the combination of a generally cylindrical induction coil assembly, means at one end of said coil assembly to feed billets axially forward into the interior of said coil assembly, an abutment member fixed within said coil assembly adjacent the said one end thereof to prevent the return movement of a billet positioned within the coil assembly, a thermocouple element movable into and out of the other end of said coil assembly, means to forcibly move said thermocouple element into the said other end of said coil assembly whereby said billet is in pressure contact with said abutment member and said thermocouple element.

5. Apparatus according to claim 4 further characterized by said abutment member being located in the lower portion of said cylindrical coil assembly and defining a space between its upper extremity and the upper wall of said coil assembly which is sufficient for the passage therethrough of a forwardly moving billet, said abutment member, presenting an abutment surface which engages the end face of a billet lying forwardly of said abutment member and resting on the bottom wall of said coil assembly.

6. Apparatus according to claim 4 further characterized by said abutment member including means operative upon the forward feeding movement of a billet into said coil assembly to retract to permit of the passage of said billet, said last mentioned means moving into abutting relation with the rearward end face of said billet upon the same being moved to a position forwardly of said abutment member.

7. In an electric induction billet heating furnace, the combination of a generally cylindrical induction coil assembly, means at one end of said coil assembly to feed billets axially forwardly into the interior of said coil assembly, an abutment member positioned in said coil assembly adjacent the said one end thereof to prevent the return movement of a billet positioned within the coil assembly, thermocouple means at the other end of said coil assembly and movable into and out of the interior thereof, a beam-like member of elongated dimensions mounted for longitudinal movement with respect to said coil assembly and mounting at its opposite ends said thermocouple means and said means to feed, and means to reciprocate said beam-like member whereby to simultaneously move said thermocouple means and means to feed in the same direction.

8. Apparatus according to claim 7 further characterized by said means to feed and said thermocouple means being spaced apart a distance in excess of two billet lengths.

9. Apparatus according to claim 7 further including billet storage means located at said one end of said coil assembly for holding a plurality of billets in side-by-side relation, means for transferring billets one at a time from said rack into axial alignment with said coil assembly, said means including a control arm connecting said beam-like member and operable upon longitudinal movement thereof to effect the transfer of a billet.

10. In an electric induction billet heating furnace, the combination of a generally cylindrical induction coil assembly, means at one end of said coil assembly to feed billets axially forwardly into the interior of said coil assembly, means secured within said coil assembly to restrain a billet against rearward movement in said coil assembly, means to move a thermocouple element rearwardly into the other end of said coil assembly and into contact with the forward end face of said billet, and means to retract said thermocouple element in a forwardly direction while feeding billets into said coil assembly.

11. Apparatus according to claim 10 further characterized by said coil assembly being arranged when energized to exert a rearward magnetic force upon a billet positioned within said coil assembly and said means to restrain comprising an abutment member adapted to engage the rearward end face of said billet.

12. Apparatus according to claim 10 further characterized by said means to feed and said thermocouple being mounted upon a common longitudinally movable element.

13. In an electric induction billet heating furnace, the combination of a generally cylindrical induction coil assembly, means at one end of said coil assembly to feed billets axially forwardly into the interior of said coil assembly, and a resilient abutment member extending along the axis of said coil assembly for preventing return movement of a billet positioned therein, said member having a fixed end fastened at the inner surface of said coil assembly and a free end which extends radially inwardly toward the axis of the coil assembly whereby a billet entering the coil assembly will deflect said free end radially outwardly until the rearward end face of the billet passes over the free end to allow the same to spring radially inwardly.

14. In an induction billet heater, the combination of a generally cylindrical induction coil assembly, means at one end of said coil assembly to feed billets axially forwardly into the interior of said coil assembly, and an abutment member extending radially inwardly from the inner periphery of said coil assembly and into the path of said billets for permitting forward movement of said billets into the interior of said coil assembly while preventing rearward movement of the billets out of said one end.

15. In an induction billet heater, the combination of a generally cylindrical induction coil assembly, means at one end of said coil assembly to feed billets axially forwardly into the interior of said coil assembly, and an abutment member extending radially inwardly from the inner periphery of the coil assembly at the said one end thereof for permitting forward movement of said billet into the interior of said coil assembly while preventing rearward movement of the billet out of said one end, said abutment member being located at a fixed position along the axial length of said coil assembly.

16. In an electric induction billet heating furnace, the combination of a generally cylindrical induction coil assembly, means at one end of said coil assembly to feed billets axially forwardly into the interior of said coil assembly, a first abutment member secured within said coil assembly adjacent the said one end thereof to prevent the return movement of a billet positioned within the coil assembly, a second abutment member movable into and out of the other end of said coil assembly, and means to forcibly move said second abutment member into said other end of the coil assembly whereby to bring the second abutment member into pressure contact with the forward end of a billet.

17. In an electric induction billet heating furnace, the combination of a generally cylindrical induction coil assembly, means at one end of said coil assembly to feed billets axially forwardly into the interior of said coil assembly, a first abutment member positioned in said coil assembly adjacent the said one end thereof to prevent return movement of a billet positioned within the coil assembly, a second abutment member at the other end of said coil assembly and movable into and out of the interior thereof, an elongated member mounted for longitudinal movement with respect to said coil assembly and mounting at its opposite ends said means to feed and said second abutment member, and means to reciprocate said elongated member whereby to simultaneously move said means to feed and said second abutment member in the same direction.

18. In an electric induction billet heating furnace, the combination of a generally cylindrical induction coil assembly, means at one end of said coil assembly to feed billets axially forwardly into the interior of said coil assembly, a first abutment member located within said coil assembly at a fixed position along the axial length thereof and adjacent the said one end thereof to prevent return movement of a billet positioned within the coil assembly, and a second abutment member at the other end of said coil assembly and movable into and out of the interior thereof to engage a billet positioned within the coil assembly.

References Cited in the file of this patent
UNITED STATES PATENTS
2,427,332  Strickland _____ Sept. 9, 1947
2,676,234  Lackner et al. _____ Apr. 20, 1954